Nov. 15, 1938.   Z. DE HORVATH ET AL   2,136,376
MANUFACTURE OF ZINC SULPHIDE
Filed Dec. 7, 1934

ROASTED ZINC ORE - 68-70% ZN.
↓
CAUSTIC SODA TREATMENT
(CAUSTIC SODA SOLUTION - 50% NaOH)
IN CYCLICAL PROCEDURE
↓
.7 TON CAUSTIC SODA TO 1 TON ORE
↓
RAW SODIUM ZINCATE LIQUORS
↓
PURIFICATION OF SODIUM ZINCATE SOLUTION
(SELECTIVE PRECIPITATION OF HEAVY METALS WITH
PURE FLOWERS OF SULPHUR WITH ADDITION OF LIME
↓
CENTRIFUGED
↓
PURIFIED SODIUM ZINCATE LIQUORS
↓
PRECIPITATION OF ZINC SULPHIDE
WITH PURE SULPHUR
↓
WASHING OF PRECIPITATE
WITH WATER
↓
PRECIPITATED AND WASHED ZINC
SULPHIDE AND ZINC OXYSULPHIDE RAW PIGMENT
↓
ACID ($H_2SO_4$) TREATMENT FOR REMOVAL
OF COMBINED ZINC OXIDE PRESENT
↓
WASHING OF ACID TREATED ZINC SULPHIDE TO
REMOVE ZINC SULPHATE AND FREE ACID
↓                                        ↓
WASH WATER CONTAINING          ZINC SULPHIDE RAW PIGMENT
ZINC SULPHATE SENT TO          NEUTRALIZED WITH CAUSTIC
ZINC HOUSE OF LITHOPHONE       SODA FOR REMOVAL OF LAST
PLANT FOR RECOVERY OF ZINC          TRACES OF ACID
                                        ↓
                                    FILTER PRESSED
                                        ↓
                                       DRIED
                                        ↓
                                     CALCINED
                                        ↓
                                     QUENCHED
                                        ↓
                                    WET GROUND
                                        ↓
                             ACIDULATED WITH ACID ($H_2SO_4$)
                                        ↓
                                      WASHED
                                        ↓
                                   NEUTRALIZED
                                        ↓
                                   FILTER PRESSED
                                        ↓
                                       DRIED
                                        ↓
                                      MILLED
                                        ↓
                                      PACKED

Inventors:
Zoltan De Horvath
William B. Paris
By Herldon Bowen
    attorney

Patented Nov. 15, 1938.

2,136,376

UNITED STATES PATENT OFFICE 2,136,376

MANUFACTURE OF ZINC SULPHIDE

Zoltan de Horvath, Western Springs, and William B. Paris, Argo, Ill., assignors to The Eagle-Picher Lead Company, Cincinnati, Ohio, a corporation of Ohio Application December 7, 1934, Serial No. 756,474

9 Claims. (Cl. 23—135)

Our invention relates to the manufacture and purification of alkaline zincate solutions suitable for use in the manufacture of valuable zinc compounds. The usual method used in the preparation of zinc solutions applicable in the preparation of such zinc compounds, as, for example, zinc sulphate, is carried out through the use of acid such as sulphuric acid on zinc products such as roasted zinc ore, obtained in roasting natural zinc sulphide (sphalerite), zinc oxide, zinc scrap or other zinciferous materials. Such zinc solution prepared by acid extraction is carefully purified, due to the fact that large percentages of the iron, copper and cadmium, as well as other impurities present, pass into solution and must be removed before a sufficiently pure zinc solution can be obtained for the preparation of zinc compounds requiring a high degree of purity.

Among the objects of the invention is the provision of a continuous step-by-step method for manufacturing zinc sulphide.

Another object of the invention is the provision of an improved process for extracting the zinc values from substances containing the same.

A still further object of the invention is to provide a practical means for manufacturing zinc sulphide pigment in a continuous operation, and in such a manner that nearly all the reagents employed will be recovered in a valuable commercial form, whereby the operation is invested with a higher degree of efficiency than has heretofore been considered possible.

Further objects are to provide a method of maximum simplicity, efficiency, economy of operation, and such further objects, advantages, and capabilities as will later more fully appear and are inherently possessed thereby.

The invention further resides in the combination of steps, construction and arrangement illustrated in the accompanying diagram, and where we have shown a preferred embodiment it is to be understood that the same is susceptible of modification and change, and comprehends other details, arrangement of parts, methods, features and constructions, without departing from the spirit of our invention.

The present process embodies the use of alkaline hydroxides in cyclical operation, whereby we obtain the maximum yield of zinc in solution, with the minimum consumption of alkaline hydroxides. By this we mean the treatment of the partially extracted and freshly added roasted zinc values with the recovered caustic alkali solutions obtained at later stages in the process, together with the addition of alkaline hydroxides in an amount sufficient to keep the percentage of alkali high enough to possess the requisite extracting power.

When the raw material containing zinc oxide is treated with the solution of alkaline hydroxide, the zinc content passes into solution as alkaline zincate to an extent dependent on the circumstances of the operation. By this we mean that the greater the excess of alkaline hydroxide and the higher its concentration the more effective will be the extraction. In the course of this extraction, two different sludges are formed, one consisting of the partially extracted zinciferous material, which is subsequently re-extracted, and the other principally of hydroxide of iron and siliceous materials, both containing large amounts of extractable zinc. In order to recover this zinc value, which is important economically, we have found that the iron and siliceous sludge may be continuously separated from the zinciferous residues by any effective means, and the zinc separately re-extracted from the iron and siliceous sludges by either alkaline or acid extraction. In addition, the removal of the iron and siliceous sludge removes a large part of the iron from the cycle and thereby aids the operation economically. The iron and siliceous sludge may contain up to 30% of the zinc value present in the zinc material, and when this is re-extracted by an alkaline solution and the solution returned to the system, we are enabled to increase recovery which makes the operation more practicable from an economical basis. By this means we extract and recover approximately 85% of the total original zinc value present. This yields an alkaline zincate liquor which after purification can be used for the manufacture of a marketable zinc sulphide pigment. If the iron sludge is re-extracted with an acid such as sulphuric acid, the solution serves admirably for the production of other zinc componds, such as, lithopone.

Upon the separation of the alkaline zincate solution from the precipitated sludge consisting of iron hydroxide and siliceous matter, it is further treated to remove certain undesirable impurities consisting mainly of lead, copper and cadmium. We have found these impurities can be selectively precipitated through the use of elemental sulphur. In other words, only sufficient sulphur is added to precipitate the more insoluble impurities. This is of the utmost importance in our process, as the sulphides of copper, lead and cadmium will be carried down in sludge form, leaving the zinc in solution.

The precipitate obtained from the sulphur treatment for the removal of impurities is in a condition difficult to handle, in that it is not readily settled or filtered, because the filter media is corroded by the caustic solution and the production is almost nil, as the fines clog up the filter cloth. To overcome this we remove the precipitated sulphides from the liquor by the addition of lime which leaves a clear supernatant liquor, that is removed from the precipitate by decantation, and yields a purified alkaline zincate liquor in a clear state, free from metallic impurities, which is ready for precipitation of the raw zinc sulphide pigment.

From this purified alkaline zincate solution we precipitate our raw zinc sulphide pigment. To accomplish this elemental sulphur is added in the ratio of 85 pounds to 100 pounds of zinc in solution, this ratio of sulphur to zinc being such that complete precipitation of the zinc is not effected, being from 90–95% of the total zinc in solution. In the precipitation of the raw zinc sulphide pigment, we have discovered that temperature control of the precipitation is of the utmost importance, and failure to provide this will yield a pigment characterized by poor color, low opacity, lack of tinting strength and hiding power. Our process can be best carried out by effecting precipitation at a temperature not to exceed 40° C., until such time as the reaction is practically completed, and thereafter applying heat to complete the precipitation.

The precipitate formed by the action of sulphur on the alkaline zincate solution comprises zinc sulphide, together with zinc oxide in chemical combination, which we call zinc oxysulphide. This precipitate is removed by filtration and represents our raw zinc sulphide pigment, being a mixture of zinc sulphide and zinc oxysulphide.

The caustic liquors obtained from the removal of the precipitate of zinc sulphide and zinc oxysulphide consist principally of alkali hydroxide, alkali thiosulphate and alkali sulphate in solution, which are formed by the action of approximately 50% of the sulphur used in the precipitation of the zinc sulphide and zinc oxysulphide from the alkaline zincate liquor, the other 50% being consumed in the formation of the zinc sulphide and zinc oxysulphide pigment. These liquors, after removal of the alkaline salts by continuous crystallization are used in the initial extraction of the zinciferous materials and constitute an important economical part of the cyclical operation. The alkali thiosulphate obtained from these alkaline liquors through the process of recrystallization is a valuable article of commerce, and due to this commercial value, and the fact that we obtain it as a by-product, makes our process economically practicable.

The raw zinc sulphide and zinc oxysulphide pigment has the approximate chemical composition.

| | Percent |
|---|---|
| Zinc sulphide | 83 |
| Zinc oxide | 11 |
| Water of hydration | 6 |

This must be deprived of its chemically combined zinc oxide content to obtain a true zinc sulphide pigment with the desired properties. The zinc oxide content can be removed by treating with sulphuric acid with a strength of ½% to 1%. The process is carried out by agitating the zinc sulphide and oxysulphide pigment with sulphuric acid of such a strength, which converts the zinc oxide to zinc sulphate, leaving a zinc sulphide pigment ready for subsequent treatment. The filtrate containing zinc sulphate obtained by this extraction is in a very pure form and suitable for use in any operation requiring zinc sulphate as a raw material, as, for instance, in the manufacture of lithopone, and where so used renders our process of still greater industrial value.

Following the sulphuric acid treatment for the removal of zinc oxide the zinc sulphide pigment is washed and treated with dilute alkali solution for the removal of the last traces of sulphuric acid which might be present. This pigment after subsequent washing and filtration is dried and calcined. It is then quenched in water acidulated with sulphuric acid which has the double advantage of removing the final traces of zinc oxide which might have formed during muffling, as well as improving the color by converting it from a yellow to a white tone. This yields a finished zinc sulphide pigment of exceptional purity and pigmentary qualities. The product is milled, washed, filter-pressed, dried, ground, and packed and is then ready for use.

From this description of our process it is plainly evident that in this operation we recover alkali thiosulphate and zinc sulphate as by-products which are commercially valuable.

The following is given as a specific example of the process, it being our intention not to limit this invention to the example cited, since it is obvious that proportions can be varied without departing from the spirit of the invention:

As raw material we use zinc oxide prepared by roasting highly purified zinc sulphide ore (sphalerite) which may have the following analysis:

| | Percent |
|---|---|
| Zinc | 68.00–70.00 |
| Copper | .06– .07 |
| Cadmium | .20– .30 |
| Iron | 1.00– 3.00 |
| Lead | .03– .06 |
| Calcium oxide | 1.00– 2.00 |
| Sulphur as sulphur trioxide | 1.50– 3.00 |

As an extracting medium we use a 50% solution of caustic soda prepared by dissolving one part by weight of pure sodium hydroxide in one part by weight of water. To one hundred pounds of roasted zinc ore of the above given composition we add seventy pounds of pure sodium hydroxide in solution and submit to agitation at a temperature of approximately 80° C. for a period of from three to four hours until the required amount of zinc is dissolved. After extraction is completed, the solution is allowed to cool and settle, whereupon stratification takes place, the partially extracted zinc ore first settling out, followed by a sludge consisting of iron hydroxide and siliceous matter. The clear sodium zincate liquor is carefully drawn off by decantation. The sludge consisting of iron hydroxide and siliceous matter is then removed and subsequently re-extracted with sodium hydroxide for the recovery of occluded zinc oxide. The iron hydroxide obtained by the extraction with sodium hydroxide is suitable as raw pigment for the production of iron pigments which are of commercial value. The strata of iron hydroxide and siliceous matter may, if desired, be extracted with an acid solution, such as sulphuric acid and the zinc sulphate solution obtained used as raw material for the manufacture of lithopone.

The residue is allowed to remain in the extracting tank and additional roasted zinc ore added, together with caustic liquors obtained in the cyclical process, the concentration of which is raised to the proper extracting strength by sufficient raw caustic soda solution, in order to effect cyclical extraction.

The raw sodium zincate liquor is purified by adding selected amounts of sulphur, the amount added being entirely dependent upon the amount of metallic impurities present. In the example cited sulphur would be added in the amount of one and eight tenths pounds per hundred pounds of zinc in solution. Using this proportional amount of sulphur based on a high-grade ore as given, the impurities are precipitated as sulphides. Calcium oxide (lime) is then added in the amount of ten pounds per hundred pounds of zinc in solution whereby the metallic impurities are rapidly settled. The purified sodium zincate liquor is then removed and is ready for precipitation of the raw zinc sulphide pigment. This is accomplished by adding sulphur in the ratio of 100 pounds of zinc in solution to 85 pounds of sulphur. The temperature conditions are carefully controlled as precipitation is effected at a temperature not in excess of 40° C. until the reaction is practically complete, and thereafter heat is applied to complete the precipitation.

From this precipitation we obtain ninety-three pounds of zinc sulphide and zinc oxysulphide precipitate. From the liquor resulting from this precipitation of zinc sulphide and zinc oxysulphide, we obtain, by recrystallization, approximately seventy-three pounds of sodium thiosulphate crystals of commercial purity. The washed precipitate consisting of zinc sulphide and zinc oxysulphide is then treated with sulphuric acid diluted to a strength of from ½ to 1%, for the purpose of extracting the zinc oxide from the zinc oxysulphide. The zinc sulphate solution obtained by this treatment is used for the manufacture of lithopone. After the treatment with sulphuric acid we obtain seventy-seven pounds of zinc sulphide raw pigment which is then treated for neutralization of the free acid with caustic solution, washed, filtered, muffled, quenched in water acidulated with sulphuric acid, filtered, dried and milled. From this example we would obtain approximately seventy-one pounds of finished zinc sulphide pigment.

Having thus described our invention, what we claim as new and desire to secure by Letters Patent, is:

1. The improvement in the method of manufacturing zinc sulphide pigment by wet chemical precipitation, which consists in preparing an alkaline zincate solution, treating with sufficient sulphur and lime for the removal of the metallic impurities, separating the solution from the precipitated impurities, and precipitating the zinc from the solution by the addition of sulphur, washing the precipitate with acidulated water, treating with caustic solution to neutralize the last traces of acid, removing the zinc sulphide pigment by filtration, drying, muffling, quenching in acidulated water, drying and pulverizing the resultant product.

2. The improvement in the method of manufacturing zinc sulphide pigment by wet chemical precipitation which consists in preparing an alkaline zincate solution, treating with sulphur in an amount less than is necessary to precipitate the zinc for the removal of the metallic impurities, adding lime to effect proper settling, removing the residual alkaline zincate liquor, precipitating the zinc from the alkaline zincate liquor by the addition of sulphur, washing the precipitate with acidulated water, treating with caustic solution to neutralize the last traces of acid, removing the zinc sulphide pigment by filtration, drying, muffling, quenching in acidulated water, drying and pulverizing the resultant product.

3. The improvement in the method of manufacturing zinc sulphide pigment by wet chemical precipitation, which consists in preparing an alkaline zincate solution, treating with sulphur in an amount less than is necessary to precipitate the zinc for the removal of the metallic impurities, removing the residual alkaline zincate liquor, precipitating the zinc from the alkaline zincate liquor by the addition of sulphur, washing the precipitate with acidulated water, treating with caustic solution to neutralize the last traces of acid, removing the zinc sulphide pigment by filtration, drying, muffling, quenching in acidulated water, drying and pulverizing the resultant product.

4. The improvement in the method of manufacturing zinc sulphide pigment by wet chemical precipitation, which consists in preparing an alkaline zincate solution directly from zinc oxide prepared by the roasting of zinc sulphide ore and treating the roasted zinc ore with an extracting medium consisting of a 50% caustic solution prepared by dissolving 1 part by weight of pure alkali hydroxide and 1 part by weight of water, adding 100 pounds of roasted zinc ore to 70 pounds of the pure alkali hydroxide in solution, and submitting to agitation at a temperature of approximately 80° C. for a period of three to four hours, removing the alkaline zincate liquor from the stratified zinc ore residue and the sludge consisting of iron hydroxide and siliceous matter, re-extracting the occluded zinc oxide from the sludge consisting of iron hydroxide and siliceous matter with acid solution adding sufficient sulphur to the alkaline zincate liquor to precipitate the metallic impurities, removing the purified alkaline zincate liquor, adding sulphur in the amount of 85 pounds per hundred pounds of zinc in solution, and precipitating at a temperature not in excess of 40° C. until the reaction is practically completed, raising the temperature to complete the reaction, removing the precipitated zinc sulphide and oxysulphide, treating with sulphuric acid of a strength of ½ to 1%, washing the zinc sulphide precipitate, neutralizing any free acid with caustic solution, filtering, muffling, quenching in acidulated water, drying and pulverizing.

5. The step-by-step process of manufacturing zinc sulphide pigment by wet chemical precipitation, which consists in preparing an alkaline zincate solution, treating with sufficient sulphur and lime for the removal of the metalic impurities, separating the solution from the precipitated impurities, and precipitating the zinc from the solution by the addition of sulphur, washing the precipitate with acidulated water, treating with caustic solution to neutralize the last traces of acid, removing the zinc sulphide by filtration, drying, muffling, quenching in acidulated water, drying and pulverizing the resultant product.

6. The improvement in the method of making an alkaline zincate solution by wet chemical precipitation, which consists in adding zinc oxide to caustic solution made up as a 50% solution of caustic prepared by dissolving one part by weight of pure alkali hydroxide in one part by weight of water and submitting to agitation at a temperature of approximately 80° C. for a period from three to four hours, allowing the solution to settle and drawing off the alkaline zincate liquor.

7. In the manufacture of zinc sulphide by wet chemical precipitation, preparing an alkaline zincate solution, treating with sulphur in an amount less than necessary to precipitate the zinc, removing the residual alkaline zincate liquor, precipitating the zinc from said liquor by the addition of sulphur maintaining a temperature of not to exceed 40° centigrade until such time as the precipitation is practically completed, thereafter applying heat to complete the precipitation, washing the precipitate with acidulated water, treating with caustic solution to neutralize the acid, removing the zinc sulphide pigment by filtration, drying, muffling, quenching in acidulated water, drying and pulverizing the resultant product.

8. The process of treating roasted zinc sulphide ore for the production of alkaline zincate solution which comprises roasting zinc sulphide ore to crude zinc oxide and mixing the crude zinc oxide in a suitable vessel with a caustic solution of sufficient concentration to dissolve the zinc oxide together with metallic impurities present to produce a mixture, and agitating the mixture at a temperature at approximately 80° centigrade for three to four hours, cooling the mixture and separating the alkaline zincate solution from the vessel, separating the sludges containing hydroxide of iron and siliceous matter while allowing the sludge of partially extracted zinciferous material to remain in the tank and adding additional roasted zinc ore to the partially extracted zinciferous material together with caustic liquors raised to the proper extracting strength and forming alkaline zincate solution.

9. The process of treating zinc bearing materials for the production of alkaline zincate solution which comprises roasting zinc bearing materials to crude zinc oxide and mixing the crude zinc oxide in a suitable vessel with a caustic solution of sufficient concentration to dissolve the zinc oxide together with metallic impurities present to produce a mixture, and agitating the mixture at a temperature at approximately 80° centigrade for three to four hours, cooling the mixture and separating the alkaline zincate solution from the vessel, separating the sludges containing hydroxide of iron and siliceous matter while allowing the sludge of partially extracted zinciferous material to remain in the tank and adding additional zinc bearing materials to the partially extracted zinciferous material together with caustic liquors raised to the proper extracting strength and forming alkaline zincate solution.

ZOLTAN DE HORVATH.
WILLIAM B. PARIS.